US005872853A

United States Patent [19]

Marquiss

[11] Patent Number: 5,872,853

[45] Date of Patent: Feb. 16, 1999

[54] NOISE ABATEMENT DEVICE

[76] Inventor: Stanley Lynn Marquiss, 6085 Old Sacramento Rd., Plymouth, Calif. 95669

[21] Appl. No.: 668,323

[22] Filed: Jun. 26, 1996

Related U.S. Application Data

[63] Continuation of Ser. No. 165,247, Dec. 10, 1993, abandoned.

[51] Int. Cl.[6] .......... G01K 11/16; H04B 15/00

[52] U.S. Cl. .......... 381/71; 381/94; 381/73.1

[58] Field of Search .......... 381/71, 94, 73.1; 181/143, 146, 155, 156, 163, 165, 150, 148, 166, 175, 198

[56] References Cited

U.S. PATENT DOCUMENTS

| | | | |
|---|---|---|---|
| 3,812,931 | 5/1974 | Hauskins | 181/33 E |
| 4,044,203 | 8/1977 | Swinbanks | 181/332 |
| 4,069,768 | 1/1978 | Matsumoto | 105/452 |
| 4,226,299 | 10/1980 | Hansen | 181/284 |
| 4,436,179 | 3/1984 | Yamamoto | 181/210 |
| 4,583,615 | 4/1986 | Amram | 181/210 |
| 4,689,821 | 8/1987 | Salikuddin | 381/94 |
| 4,829,590 | 5/1989 | Ghose | 455/63 |
| 4,899,846 | 2/1990 | Furuta et al. | 181/210 |
| 5,370,340 | 12/1994 | Pla | 381/71 |

*Primary Examiner*—Thomas D. Lee
*Assistant Examiner*—Jerome Grant, II
*Attorney, Agent, or Firm*—James J. Brown

[57] ABSTRACT

A device and method for minimizing noise particularly adjacent a source such as a highway. A plurality of transducers (10) are oriented in a specific alignment and driven in a sequence which sends corrective pressure waves so that the noise emanating from the source will be modified upon coaction with the corrective pressure waves emanating from each transducer (10). The transducers (10) themselves include at least one pair of diaphragms (60) that are adapted to move in a arc thereby sending a pulse out from the transducers (10).

24 Claims, 12 Drawing Sheets

NOISE ABATEMENT DEVICE

This application is a continuation of application Ser. No. 08/165,247, filed Dec. 10, 1993, now abandoned.

FIELD OF THE INVENTION

This invention relates generally to an instrumentality used to abate sound adjacent a source. More specifically, the present invention is directed to a device for preventing the passage of noise from a noise generating environment to adjoining areas, such as from a highway, where vehicles traveling on a highway project noise to an adjacent neighborhood.

BACKGROUND OF THE INVENTION

Noise pollution exacts a toll on all in the society. This toll can include adverse effects that run the gamut and can include hearing impairment, stress, impediments to understanding a normal conversation and insomnia.

The existence of noise pollution in certain environments is well documented. For example, highways in densely populated areas are chronic sources of unwanted noise. As a result, one solution that has achieved extensive acceptance in communities involves building a wall along the highways. This wall serves a plurality of purposes. First, stray animals are kept from wandering onto the highway. Second, a wall of sufficient height will abate the noise from the highway immediately adjacent the road i.e. by creating a noise "shadow" adjacent the wall.

To a certain extent, it is true that there is a "shadow" on the side of the wall opposite from the highway where a sound wall is effective. However, it has been observed that a "plume" of noise will still breach the wall and instead affect an adjoining area, perhaps several blocks away from the highway. Thus, while one area immediately adjacent the wall has been protected somewhat, in effect the problem will have been diverted to an area some distance away which heretofore had been immune from the objectionable noise due to the noise having been dissipated closer to the highway by the defacto sound "baffles" that are present. Examples of such sound baffles would include shrubbery, buildings and topological variations of the terrain.

The following patents reflect the state of the art of which applicant is aware and has been included herewith to discharge applicant's acknowledged duty to disclose relevant prior art. It is stipulated, however, that none of these patents teach singly, nor render obvious when considered in any conceivable combination, the nexus of the instant invention as disclosed in greater detail hereinafter and as particularly claimed.

| PAT. NO. | ISSUE DATE | INVENTOR |
|---|---|---|
| 3,812,931 | May 28, 1974 | Hauskins, Jr. |
| 4,069,768 | January 24, 1978 | Matsumoto, et al. |
| 4,226,299 | October 7, 1980 | Hansen |
| 4,436,179 | March 13, 1984 | Yamamoto, et al. |
| 4,583,615 | April 22, 1986 | Amram |
| 4,899,846 | February 13, 1990 | Furuta, et al. |

Each of these patents can be characterized as providing a "passive" form of sound abatement in which a physical impediment such as a wall impedes the migration of sound waves that emanate from the highway. The sound waves contact the wall and the wall merely opposes the sound wave transmission. In effect, the wall is a passive barrier. As mentioned above, while there is a noise abated "shadow" cast on the other side of the wall, the noise reflected from or spilling over such a passive barrier is redirected to other areas.

SUMMARY OF THE INVENTION

The instant invention is distinguished over the known prior art in a plurality of ways. One of the starkest differentiations that the instant invention enjoys over the known prior art involves the fact that the instant invention is not a passive sound barrier that only tends to deaden noise energy by absorption. More specifically, the instant invention is an active system which projects a series of waves outwardly from an array of energy sources. These waves contact the noise waves generated on the highway. As these waves coact with noise waves emanating from vehicles traveling on the highway, the noise wave profile generated by the traffic is altered as a result of this active intervention.

While there may be various analogies which could conceivably describe the physical manner in which this active system coacts with the waves of energy emanating from traffic on the highway, some analogies may provide some insight.

One analogy involves viewing the sound waves that emanate from the highway traffic as a form of molecular excitation which in turn sends a plurality of standing waves or pulses away from the highway with each passing vehicle. The instant invention may be viewed as introducing opposing standing waves which meet the vehicular standing waves for the purpose of redirecting or attenuating the magnitude of the waves where they meet.

Another analogy invites viewing the traffic noise as a plurality of pressure waves that emanate from a stream of vehicular traffic. These pressure waves have a certain "signature" or profile. Certain characteristics of the active waves that are generated by the invention described in the present application meet those pressure waves and alter the signature or profile in some manner. Viewed from one perspective, therefor, the pressure wave emanating from the traffic can be seen as having been redirected and/or reshaped.

The instant invention also benefits from the observation that not all components of the noise emanating from a freeway environment are equally objectionable. Thus, certain frequencies or frequency ranges can be regarded as providing the most nettlesome attribute which one can correlate with unwanted noise pollution. By viewing the instant invention as filtering those most objectionable frequencies, an effective solution to noise pollution need not necessarily involve stopping all noise as does the bulky, expensive barriers which define the prior art.

For example, the noise that is generated by a tire contacting a road surface is one problem which cannot be easily solved by either tire manufacturers or by highway engineers. Desirable attributes, such as a coefficient of friction sufficiently high to provide reliable stopping or traction would have to be sacrificed for the sake of noise abatement. It has been observed from the complex, composite signal ("signature") that emanates from a highway during heavy traffic flow, that a low frequency component in the range from 10 hertz to 40 hertz provides the greatest auditory discomfort because it has the ability to penetrate great distances, is more able to resonate objects it encounters and therefore appears loud. The instant invention focuses upon, but is not limited to, addressing this frequency range in its abatement techniques.

A series of transducers is strategically placed adjacent the source of the noise e.g., along the highway. The series of transducers are configured in an array strategically oriented to provide maximum confrontation to the noise which is to be treated by the transducers. Each transducer is coupled to a source of power. All of the transducers are sequenced to operate in a specific fashion to strategically maximize the manner in which the pressure wave emanating from the noise source can be countered. The transducers direct its own pressure wave to confront the source of the noise thereby altering the manner in which the noise from the highway is perceived on a side of the transducers remote from the source of the noise.

OBJECTS OF THE INVENTION

Accordingly, is a primary object of the present invention to provide a new and novel sound abatement device for use in controlling noise pollution.

A further object of the present invention is to provide a device as characterized above which: is comparatively less expensive to manufacture than existing passive sound wall barriers, lends itself to mass production techniques, is extremely durable in construction and is safe to use.

A further object of the present invention is to provide a device as characterized above which can be placed strategically adjacent the source of the noise and is tailored to resist the most nettlesome characteristics of the noise by opposing the noise with a resistive pressure front, providing an active interference to the normal propagation of the waves that are the source of noise pollution.

Viewed from a first vantage point it is an object of the present invention to provide a device as characterized above in which a plurality of transducers oriented in an array strategically placed adjacent a source of noise pollution, each transducer in the array provided with means to alter a pressure wave emanating from the source of noise pollution, means for orchestrating the sequence in which the plural transducers are enabled, and means for selective projection of certain waves from each transducer to correlate with portions of the pressure wave to be treated.

Viewed from a second vantage point, it is object of the present invention to provide a method for abating noise pollution, the steps including: determining a signature of the source of noise pollution, determining a radiating pattern of the source of noise pollution, orienting an array of transducers strategically adjacent the source of noise pollution for meeting a pressure wave which emanates from the source of noise pollution and projecting an active pressure wave from the array of transducers to meet with the pressure wave of the source of noise pollution to alter the profile of the noise pollution.

Viewed from a third vantage point, it is an object of the present invention to provide a transducer for use in attenuating noise emanating from a source comprising in combination: means integrally formed with the transducer for inducing a corrective pressure wave, means for orienting the corrective pressure wave from the transducer towards the source of noise and means for altering a characteristic of the corrective pressure wave emanating from the transducer specific to a signature of the noise pressure wave emanating from the source of noise.

These and other objects will be made manifest when considering the following detailed specification when taken in conjunction with the appended drawing figures.

DESCRIPTION OF PREFERRED EMBODIMENTS

Figure 1:
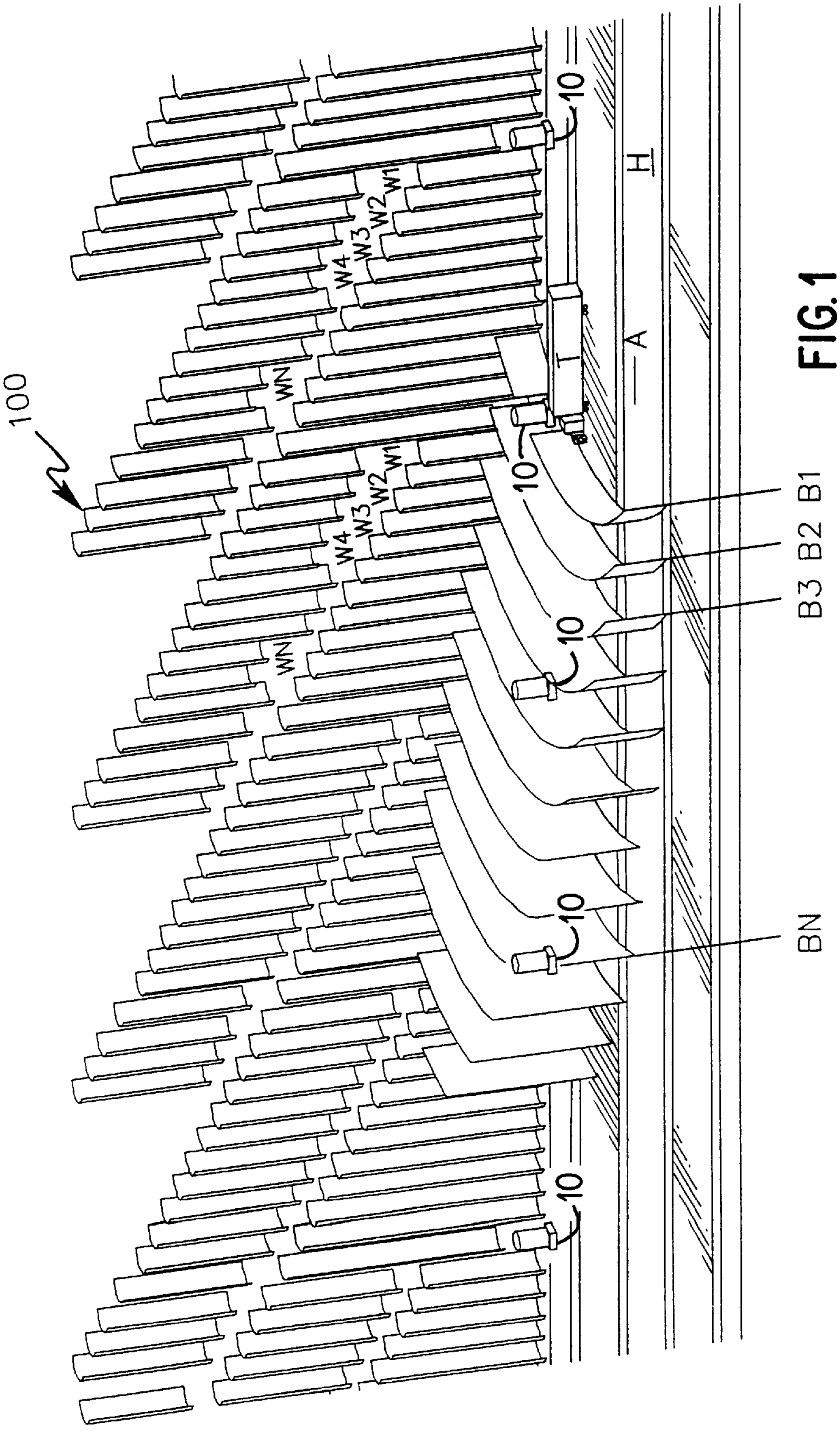
FIG. 1 is a perspective view of a truck traveling on a highway. In a simplified view, the truck is shown as propagating a series of waves schematically correlative of noise. An array of transducers according to the present invention are oriented along a side of a road and shown propagating a series of corrective pressure waves.

Considering the drawings, wherein like reference numerals denote like parts throughout the various drawing figures, reference numeral 10 is directed to the transducer according to the present invention.

Figure 4:
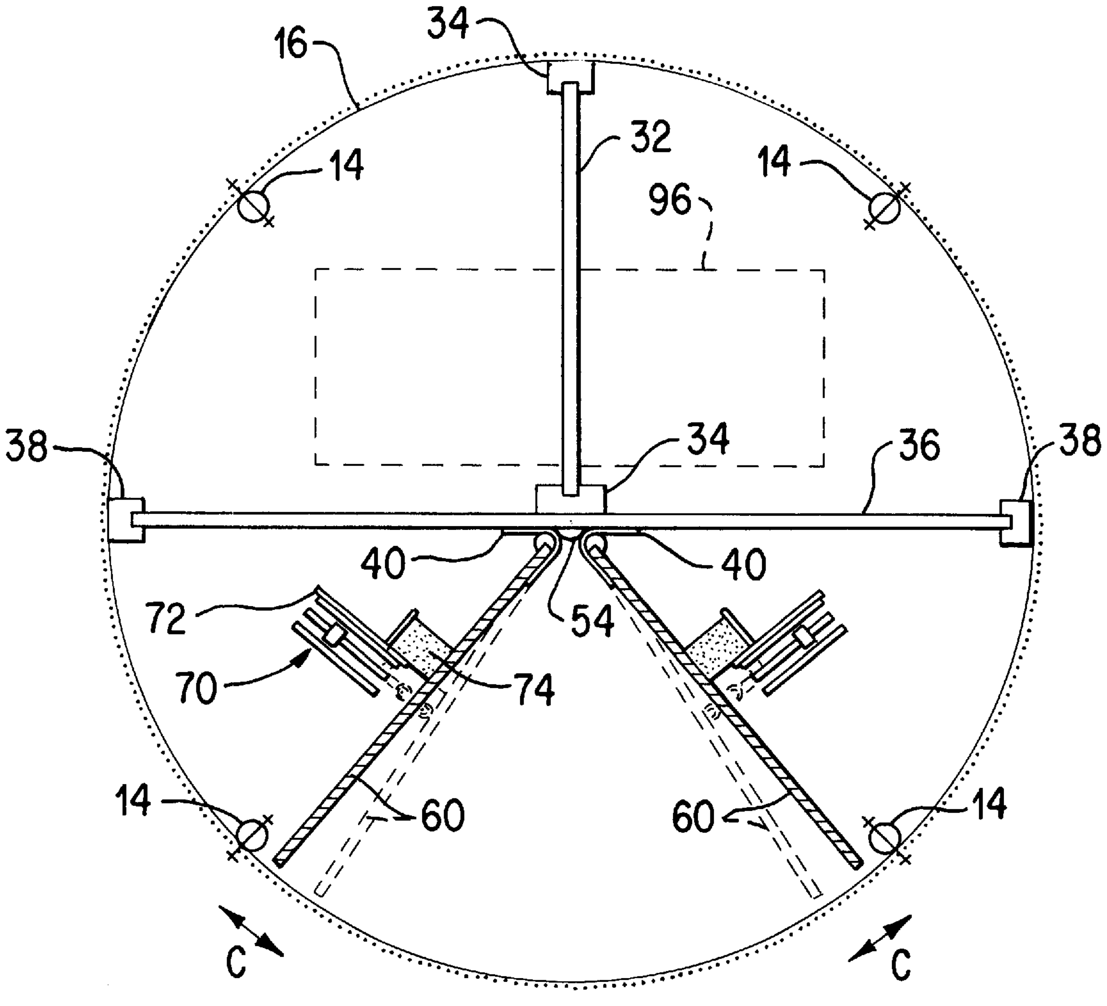
FIG. 4 is a sectional view taken along line 4—4 of FIG. 3.

In essence, and with respect to FIGS. 1 and 4, for example, a plurality of transducers 10 are oriented in an array 100 placed strategically adjacent an unwanted source of noise. As shown diagrammatically in FIG. 1, a truck T traveling on a highway H generates a series of pulses correlative of sound which is broadcast adjacent the truck T and into the ambient conditions. In one form of the invention, the array 100 of transducers 10 are placed along the highway H in a linear series, parallel to an edge of the highway H with the transducers 10 strategically oriented to provide a corrective pressure wave which interferes with the normal propagation of the noise wave associated with the truck T.

In actuality, the "snapshot" at one instant shown in FIG. 1 is a gross simplification of a "ripple" that would occur. The wave propagation of both the truck T and transducers 10 ignores all effects from previous waves correlative of prior interactivity both by the truck T and the transducers 10, not to mention waves from other sources. As should be readily evident, a non-idealized "snapshot" would not have either the uniformity or symmetry in the simplified view of FIG. 1 and would more likely be depicted as a chaotic mix of swirls which nonetheless has a gross signature. The series of waves emanating from the truck T are depicted as a series of arcuate bands $B_1$, $B_2$, $B_3$ . . . $B_n$. As the wave becomes further removed from the truck T, its noise intensity will decrease while the wave itself increases.

Similarly, the series of waves generated by any one transducer 10 also shows a series of waves $W_1$, $W_2$, $W_3$, . .

Figure 2:
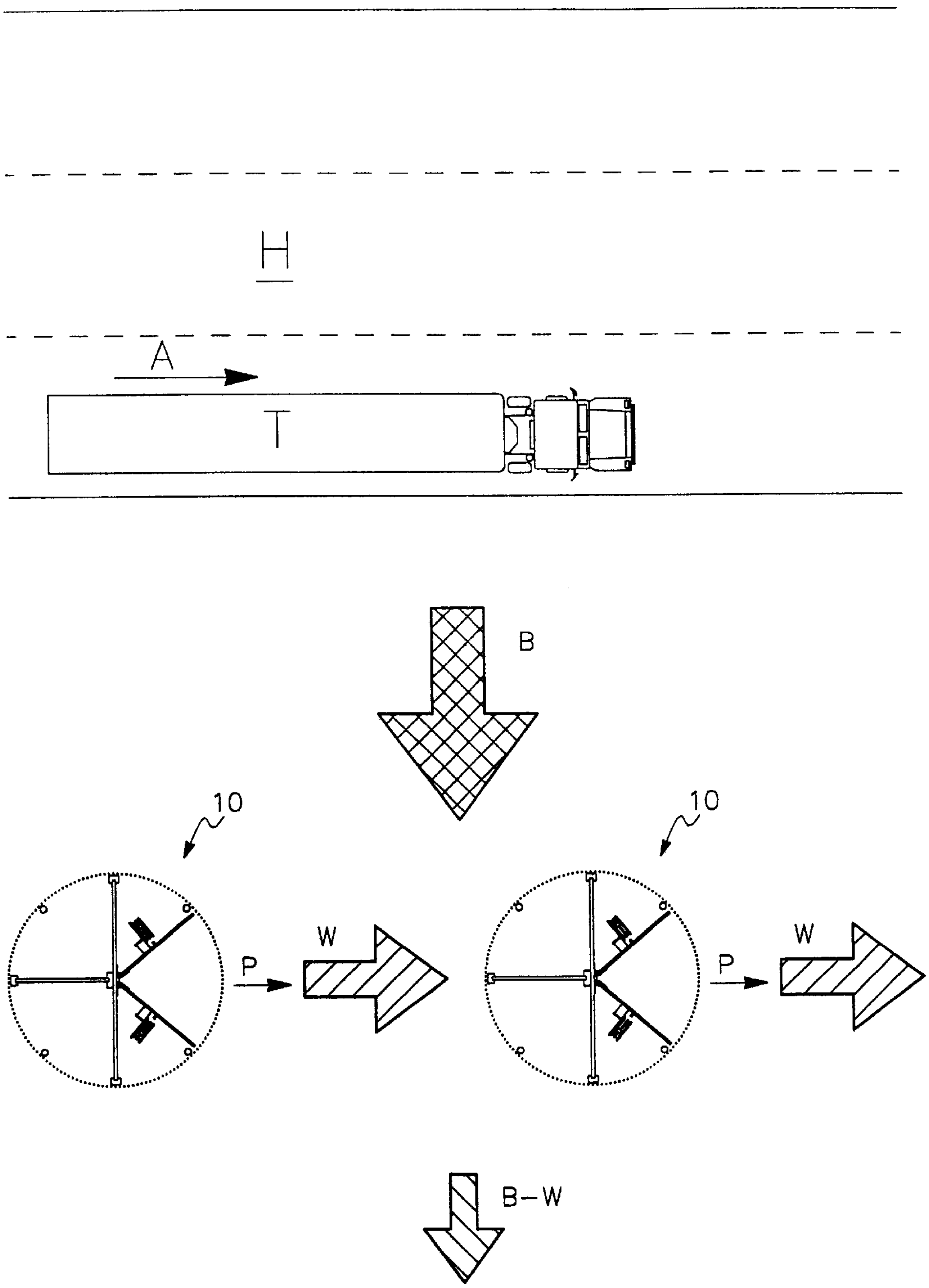
FIG. 2 is a top plan view of that which is shown in FIG. 1, schematically showing force vectors emanating from the highway and from two transducers.

. $W_n$ with the waves themselves increasing while the wave's intensity also decreases. The truck T moves in the direction of the arrow "A". The plurality of transducers 10 having outlet ports P facing the direction of truck motion "A". Corrective pressure waves W from the transducers 10 project a "curtain" which coacts with the component of the noise wave B penetrating beyond the highway H. This is graphically depicted in FIG. 2. As shown in that figure, the transducers 10 "counter" a certain component of the noise emanating from the highway thereby "filtering" certain objectionably characteristics. FIG. 2 graphically depicts the vector B emanating from the highway by virtue of the truck T emitting noise therefrom. The wave W exiting the port P of transducer 10 "subtracts" from the wave B providing a modified signal (B–W) that dissipates to ambient conditions.

Figure 3:
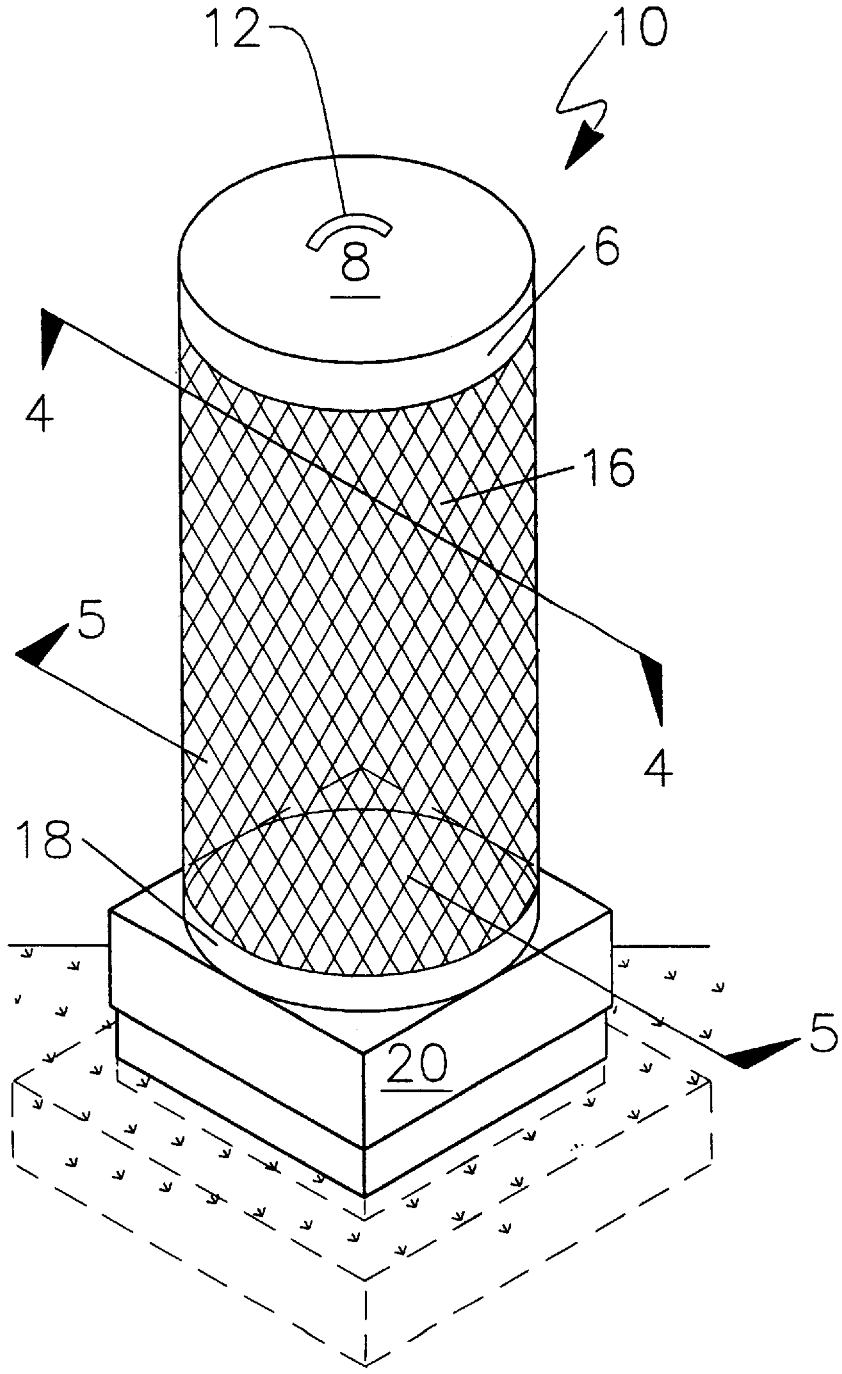
FIG. 3 is perspective view of one transducer according to the present invention.
Figure 5:
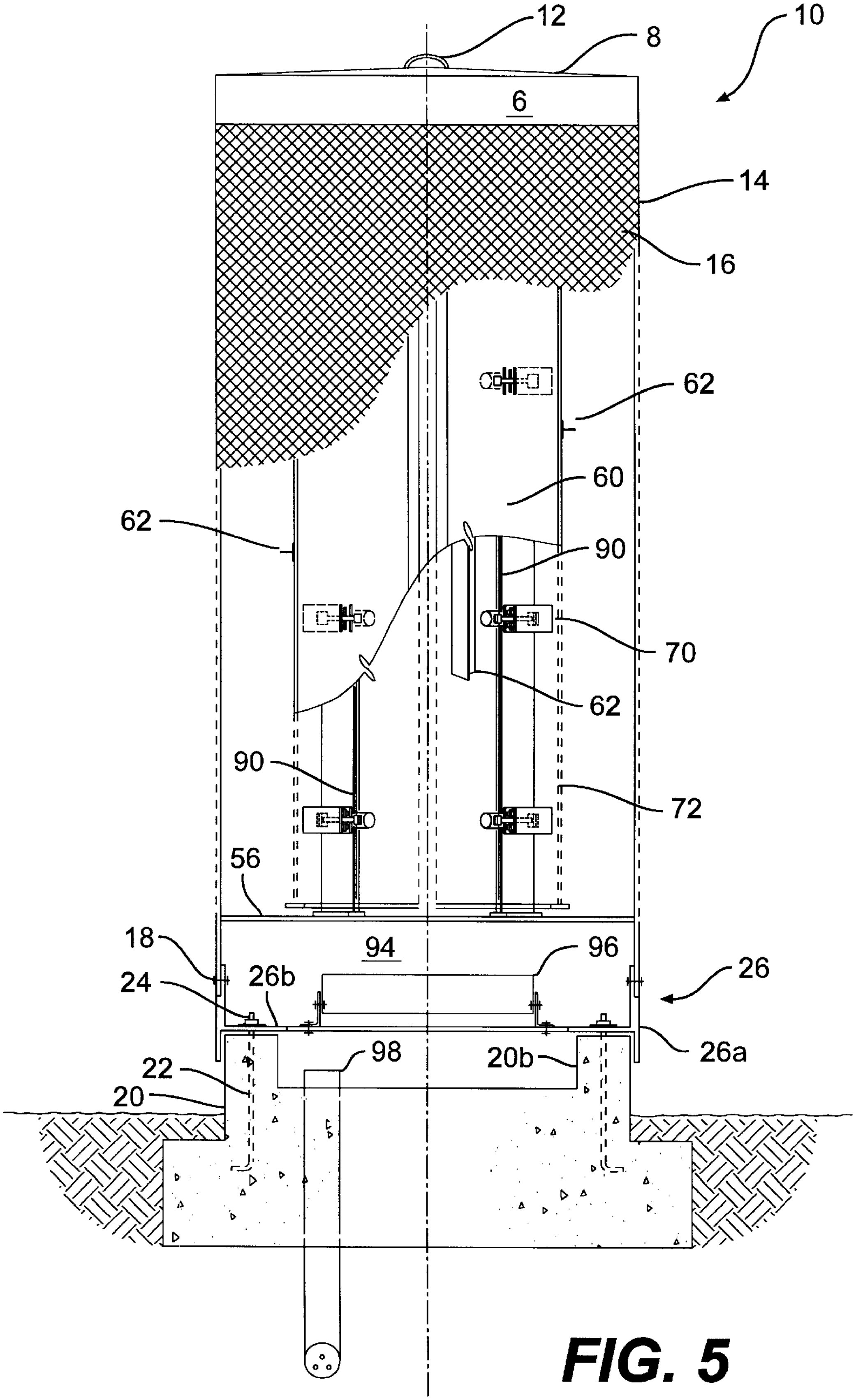
FIG. 5 is a sectional view taken along line 5—5 of FIG. 3.

More particularly, and with respect to FIGS. 3, 4 and 5, the transducer 10 is shown as including a construct of substantially cylindrical configuration having a perforated skin 16 along a medial portion thereof, a non-foraminous cap 8 at a top most portion and a depending flange 18 at a bottom portion that communicates with a concrete footing 20. More particularly, at a top-most apex, the cap 8 includes a pick-up hook 12 to facilitate placement of the transducer on the footing 20. The cap 8 has a slight crown as it extends from an outer periphery to the apex which supports the pick-up hook 12. The cap 8 is integrally formed with a downwardly extending cylindrical rim 6 which frictionally fits over the perforated skin 16. The skin 16 has an elongated cylindrical configuration. The lower most portion of the skin 16 terminates in the cylindrical flange 18 that allows the transducer 10 to be dissociated from the footing 20 should the transducer 10 be impacted by an object, such as a vehicle. The flange 18 fixes to the footing 20 via a bracket 26. The bracket 26 has a vertical portion 26*a* which nests within an inner portion of the flange 18 and is fixed thereto by means of fastener. The vertical portion 26*a* also includes a downwardly extending lip which circumscribes an upwardly extending peripheral ridge 20*b* on the footing. The peripheral ridge 20*b* also receives a horizontal portion 26*b* of the bracket 26 thereon by providing a shelf upon which horizontal portion 26*b* rests. The footing has a concrete bolt 22 extending up from the ridge 20*b* adapted to reside within a hole provided on the horizontal portion 26*b* of the bracket 26 and fixes the transducer 10 thereto by means of a nut 24.

The concrete footing 20 is separated from an interior of the transducer 10 by a floor 56 located near where skin 16 transitions to flange 18. An interior 94 is provided between the floor 56 and the footing 20. A conduit 98 which supplies power and controls such as timing information for the transducer 10 communicates with an amplifier 96 located in interior 94 above the footing 20 and adjacent the flange 18. Thus, the conduit 98, when coupled to the amplifier 96 provides a motive source for the transducer 10. Alternatively, the amplifier 96 could be located at a remote site and the conduit 98 communicate directly with the transducer 10. The cap 8 is held in spaced relationship from the flange 18 by means of a plurality of legs 14 extending therebetween and disposed within the interior of the perforated skin 16. In addition, the cap 8 is further supported in spaced relation from the floor 56 by means of a T shaped framework 30 having a diagonally disposed crossmember 36 and a buttress 32 radially extending from a center point of the crossmember and connecting to an interior face of the skin 16. The crossmember 36 and buttress 32 coact against the skin 16 by means of supports 34, 38 fixed both to the skin 16 and the buttress 32 and crossmember 36.

The crossmember 36 has two faces, a face adjacent the buttress 32 and an opposite face. The opposite face supports diaphragms 60 thereon by means of hinges 40 preferably formed from a class of materials having elastomeric properties, such as rubber characterized by its flexibility, resilience and damping capabilities. The hinges 40 are coextensive along the vertical length of the diaphragms 60 and both run substantially from a very top most portion of the crossmember 36 near the cap 8, to a lower most portion near the floor 56. The hinges 40 allow the diaphragms 60 to move in the direction of the double ended arrows "C" as will be explained.

Figure 8:
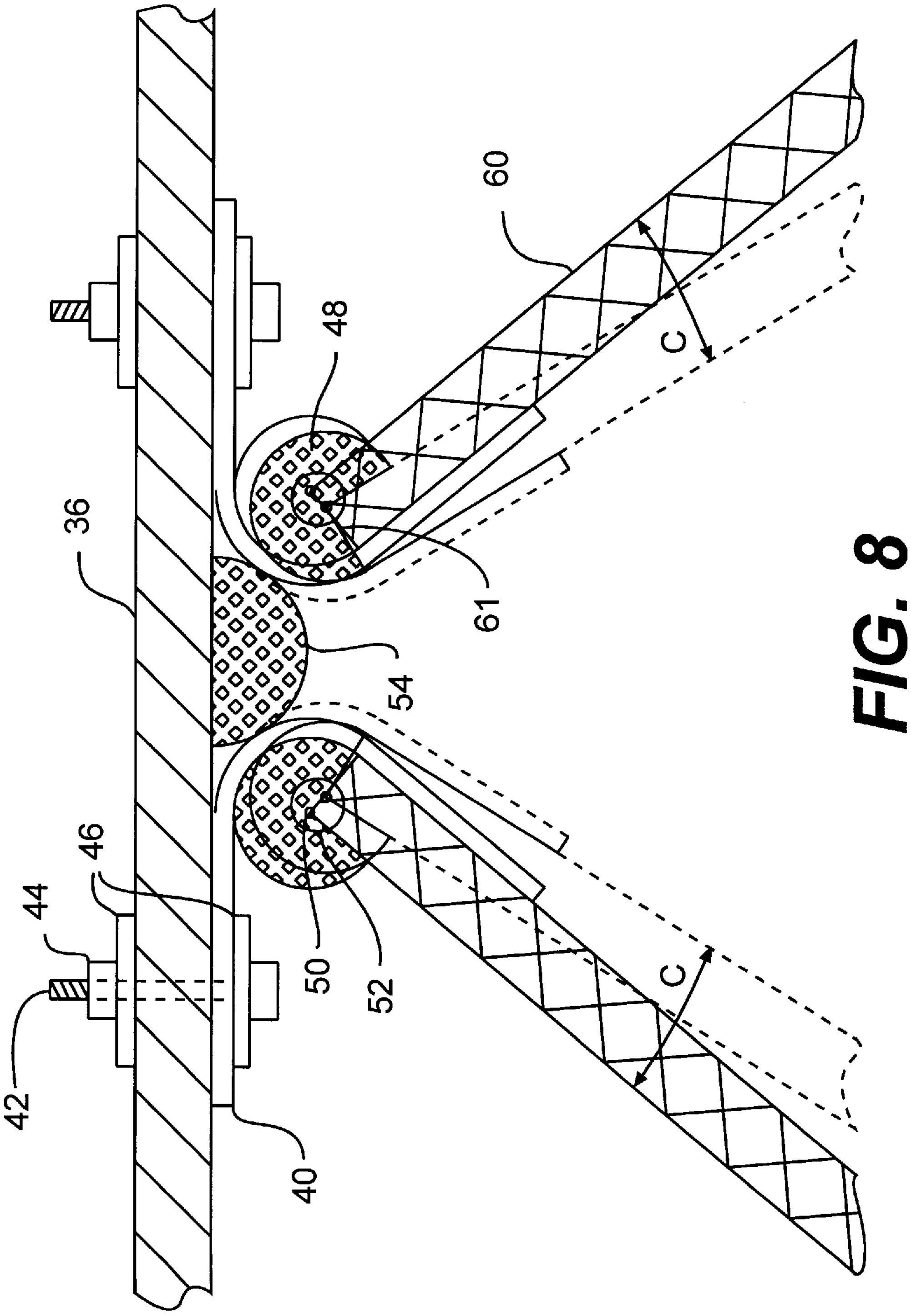
FIG. 8 is a top plan view of further details of the transducers shown in FIG. 3 through 7.

With respect to FIG. 8, the vertical edges 61 of the diaphragms 60 adjacent their connection to the hinges 40 and closest to the crossmember 36 are integrally connected to a vertically extending cylindrical dowel 48. Each dowel 48 has one quadrant removed. The removed quadrant allows a right angle corner of each diaphragm 60 to abut in secure fashion against the dowel 48 and nest within the removed quadrant for greater support along the length of the both the dowel 48 and vertical edge 61 of the diaphragm 60. Each dowel 48 therefore becomes a bearing surface against which the hinge 40 is wrapped. A center-most portion of the crossmember 36 facing the diaphragms 60 includes a semi-cylindrical spacer 54 extending the vertical length of the crossmember 36. Spacer 54 serves as a bearing surface on a side of each hinge 40 opposite from each dowel 48. Thus, as the diaphragms 60 move in an arc along the direction of the arrows C, a smooth rotation will afforded by the rolling contact of dowel 48 against spacer 54 through hinge 40. One free vertical edge of each hinge 40 is connected to the crossmember 36 by means of fasteners, such as a bolt 42, lock nut 44 and washers 46 straddling the crossmember 36 and the hinge 40 for force distribution. Another free vertical edge of hinge 40 adheres to diaphragm 60 preferably by fusing or glue.

Figure 6:
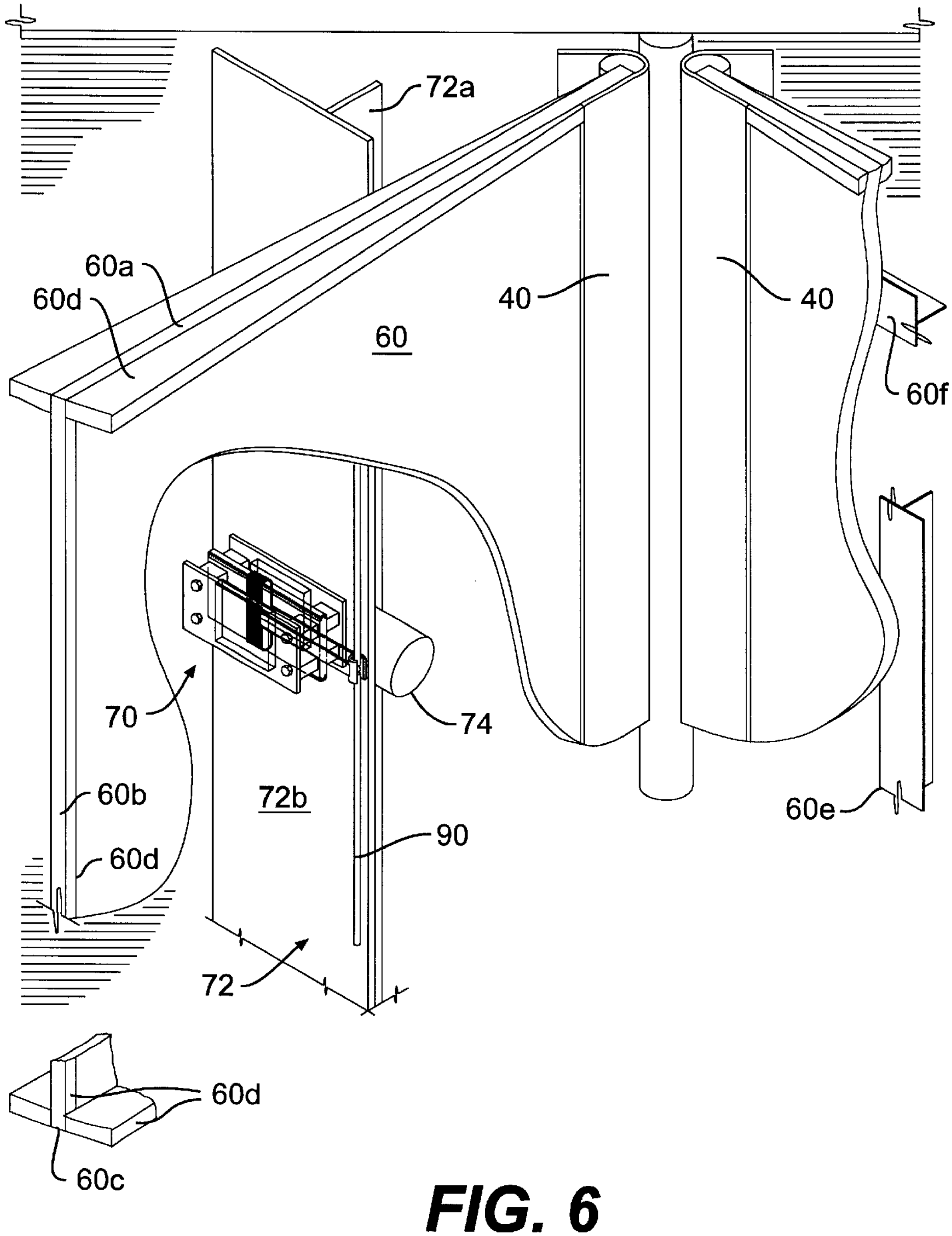
FIG. 6 is perspective view, partly in section showing of details of the transducer shown in FIGS. 3 through 5.
Figure 7:
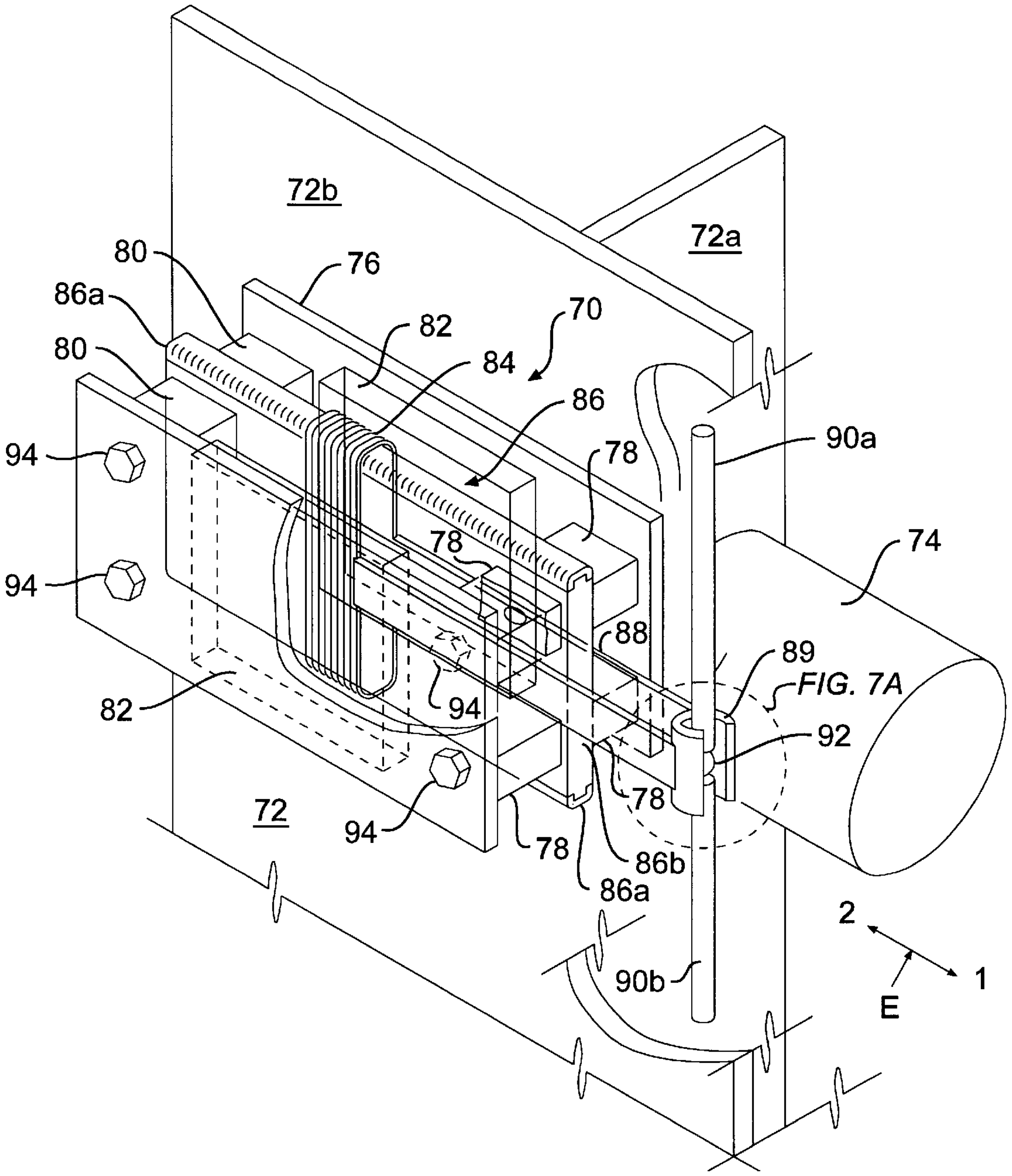
FIG. 7 is a further perspective of certain details shown generally in FIG. 6.

Another aspect of the diaphragm 60 involves its operative coupling to a driver 70 shown in FIGS. 5 through 7. In essence, a plurality of drivers 70 are supported on braces 72 which extend from the floor 56 of the transducer 10 up to the cap 8. The brace 72 is substantially T-shaped in configuration including a stem 72*a* and a T-top 72*b*. An outer surface of the T-top 72*b* supports the driver 70 as shown in FIG. 7. The stem 72*a* includes a face closest to the diaphragm 60 which supports an elastomeric spring 74 thereon for purposes to be assigned.

As shown in FIG. 6, the diaphragm 60 includes a top edge 60*a*, a side edge 60*b* remote from the hinge 40 and a bottom edge 60*c* opposite the top edge 60*a* all of which can be provided with a reinforcing border 60*d* as suggested in FIG. 6. The diaphragm 60 is preferably formed from commercial available products such as Rohacell or Divinycell. The diaphragm 60 may include longitudinally extending reinforcing filaments 60*e* and may also include horizontally oriented reinforcing filaments 60*f* for additional strength.

Each diaphragm has a diaphragm bar 90 adhered thereto. The diaphragm bar 90 in turn is connected to the driver 70. The diaphragm bar 90 is fixed to the diaphragm 60 using embedment or adhesive and is attached to the driver 70 by means of a driver arm 88 having a socket end 89 which snaps over the bar 90. In essence, the socket end 89 of the driver arm 88 is a substantially annular member having a vertically interrupted portion to allow the bar 90 to frictionally fit therewithin. A central portion of the bar 90 where it is straddled by the socket 89 can be interrupted by a bearing 92 located between an upper bar 90*a* and a lower bar 90*b* to take into account the rotation of the diaphragm 60 about arrow C and its effects on the bar 90 thus facilitates several drivers 70 to move diaphragm 60 as shown.

Figure 7A:
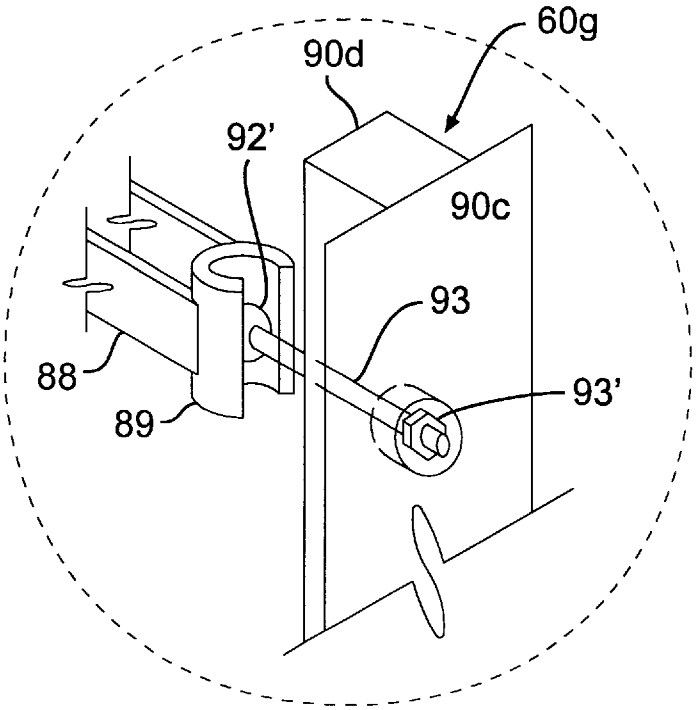
FIG. 7*a* is an alternative embodiment of that which is shown in FIG. 7, showing further details.

FIG. 7*a* shows a detailed alternative embodiment of the coupling of the driver 70 to the diaphragm 60. Each diaphragm has a reinforcing flange 60*g* which is substantially T-shaped in configuration including a top surface 90*c* and base 90*d*. The top surface 90*c* is fixed to the diaphragm 60 using embedment or adhesive. The flange 60*g* is attached to the driver arm 88 of the driver 70 by way of a stem 93. The stem 93 partially passes through a strategically located hole in the flange 60*g* and is secured thereto by nut 93'. The other end of the stem 93 has a bearing 92' operatively coupled thereto. The socket end 89 of the driver arm 88 slides over the bearing 92' thereby completing the coupling of the driver 70 with the diaphragm 60.

The arm 88 moves along the direction of double ended arrow "E" by means of magnetic excitation, causing motion of diaphragm 60 about arrow "C". The arm 88 is connected to a coil 84 which is also constrained to move in the direction of the double ended arrow E by virtue of its placement over a coil guide 86. The coil guide 86 has top and bottom surface 86*a* which promulgate low friction motion of coil 84. Coil guide 86 may have a core 86*b* formed from a non-metallic or non-ferrous substance. The coil 84 is a substantially rectangular construct having a central hollow and formed from a plurality of turns of wire. The arm 88 is attached the coil 84. The coil 84 rides over the coil guide 86 which is also a substantially rectangular construct residing within the central hollow of the coil 84. The coil guide 86 is sandwiched between a set of four front spacers 78 and four rear spacers 80. Two spacers are located on each side thereof at upper and lower elevations. The spacers 78, 80 in turn provide clearance for the coil 84 as it reciprocates along the direction of the double ended arrow E. The spacers 78 and 80 are disposed within first and second spaced parallel vertically disposed side plates 76. Plates 76 sandwich the spacers 78, 80, coil guide 86 and coil 84 therebetween. The side plates 76 are substantially rectangular stock material and are connected to the T-top 72*b* through a plurality of bolts 94 extending through side plates 76, spacers 78, 80 and coil guide 86. A pair of permanent magnets 82 are interposed between the coil guide 86 and the spacers 78, 80 and the side plates 76 located on either side of the coil 84.

In use and operation, inducing and removing a current in the coil 84 causes reciprocation of the bar 90 along the direction of the double ended arrow E through arm 88. The diaphragm 60 will move and push air in concert therewith. The stem 72*a* of the driver brace 72 has a spring 74 preferably formed from resilient foam disposed thereon and operatively coupled to the diaphragm 60. As the magnetic coil 84 oscillates by command from the amplifier 96, the motion of the arm 88 is opposed and dampened by the spring 74 as it goes in the direction of E1 shown in FIG. 7. When the field is removed from the coil 84, the spring 74 causes the diaphragm 60 to move back to an at rest position in the direction of the arrow E2. This involves placing the foam spring 74 into alternative states of tension. Releasing the tension by collapsing the field of the coil 84 allows the spring 74 to contract to an at rest position. Alternatively, the spring 74 can operate in an opposite fashion where the spring 74 is initially compressed by causing the field to move the coil 84 along the arrow E2. Relaxing the field allows the spring 74 to expand to its original at rest state. In either case, a combination of field coil excitation and spring action causes profound diaphragm throttling and pulsing motion.

With respect to FIGS. 2 and 4, it should now be apparent how the transducers 10 effect the noise emanating from a highway or other source. As the diaphragm 60 move in the direction of the arrows C between a first and second position, a pressure wave emanates from each transducer 10 and contacts the noise B as it leaves the highway H. The wave W from the transducer 10 coacts with the wave B from the highway H resulting in an appreciable reduction not only in decibel level but also in objectionable noise.

Figure 10:
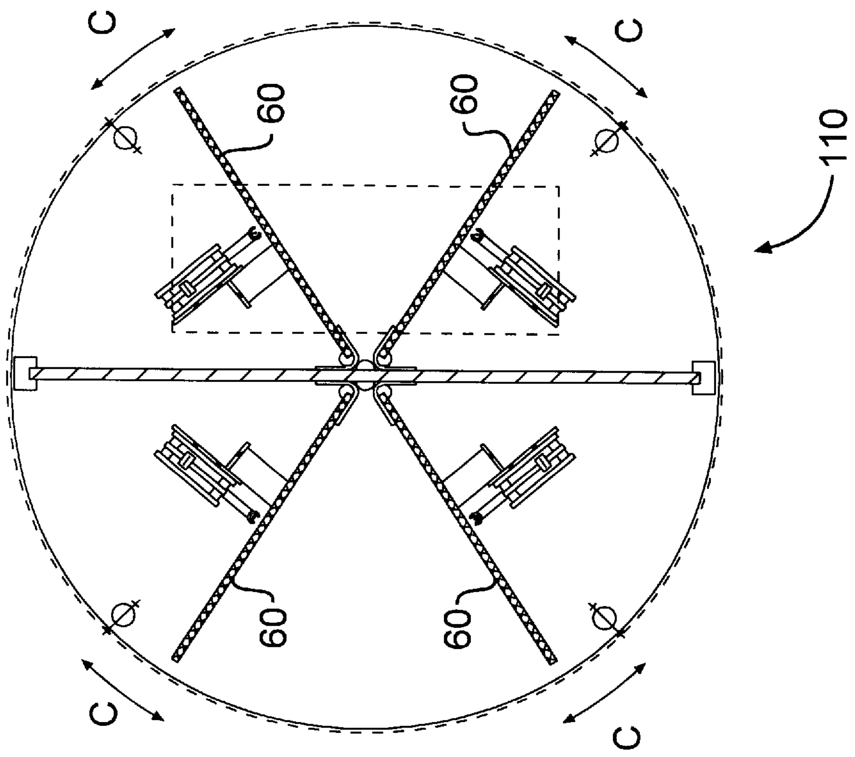
FIG. 10 is a view similar to FIG. 9 showing the second embodiment in a second position.
Figure 9:
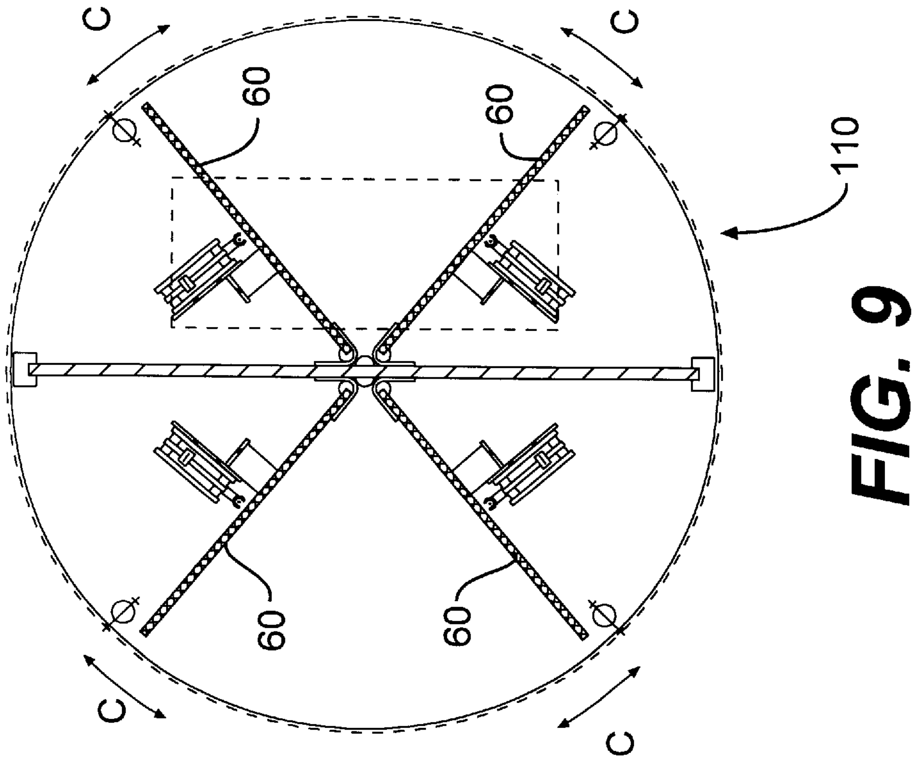
FIG. 9 is a sectional view similar to FIG. 4 showing a second embodiment in one extreme position.

FIGS. 9 and 10 reflect a transducer 110 according to a second embodiment. Only the salient differences will be explored to promulgate enhanced clarity. Whereas in the first embodiment (see e.g. FIG. 4) a buttress 32 is located on one side of the crossmember 36 opposite from the pair of diaphragms 60, in FIG. 9 and 10 the buttress 32 has been removed and a second pair of diaphragms 60 are placed on the side of the crossmember 36 that originally carried buttress 32. The second pair of diaphragms 60 have identical features to the previously delineated first pair of diaphragms 60 of the first embodiment. FIG. 9 shows the diaphragms 60 in a first position while FIG. 10 shows the diaphragms 60 in a second position. These diaphragms 60, similar to the first embodiment, move about the double ended arrows C.

Figure 11:
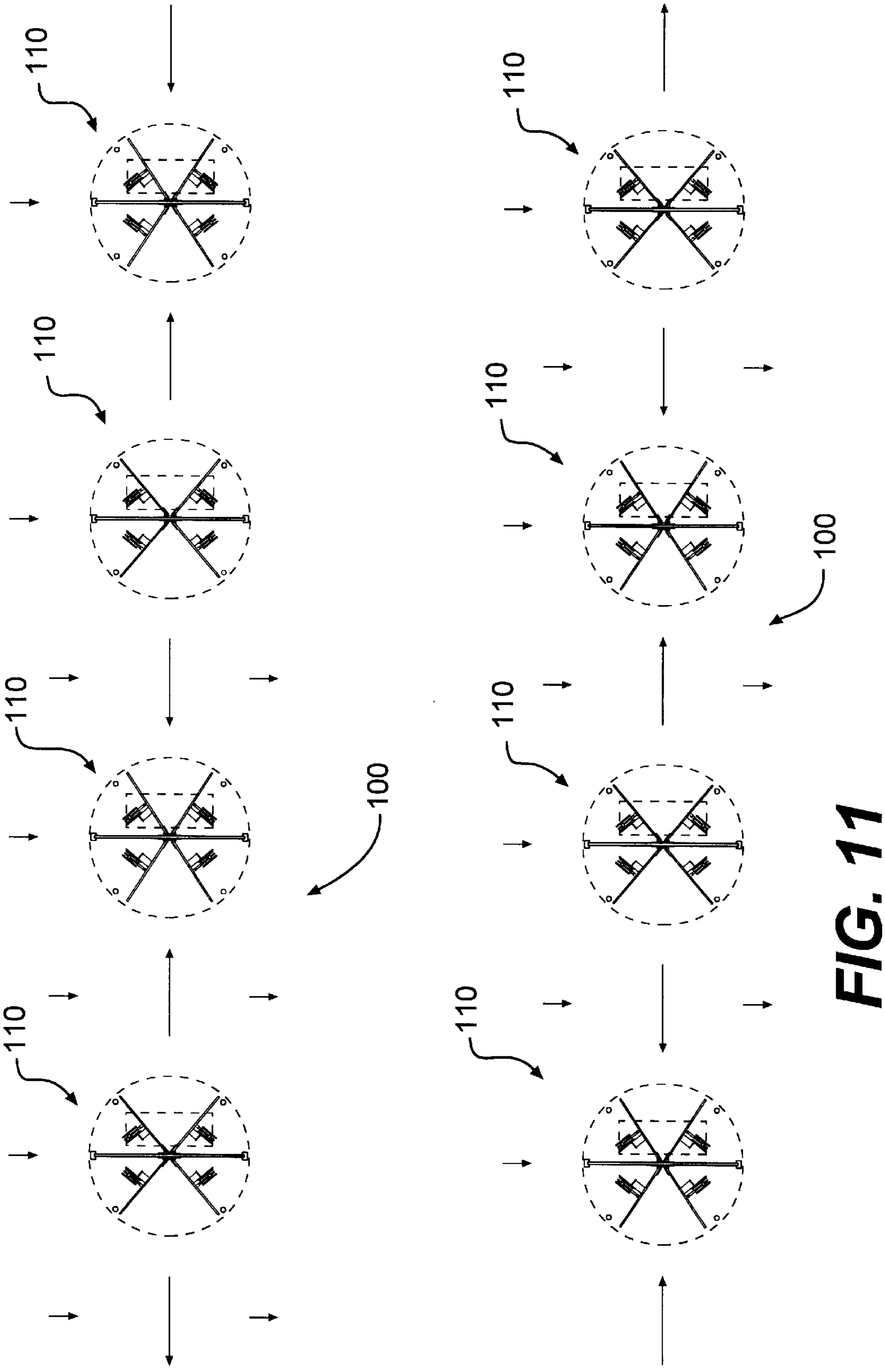
FIG. 11 shows possible orientations of the second embodiment depicted in FIGS. 9 and 10.

FIG. 11 suggests one possible strategy for orienting these double acting transducers 110 for its intended benefits. In essence, the array 100 is a linear string of transducers 110 oriented such that every other transducer 110 is operating in phase. In other words, alternate transducers 110 are opening together or closing together. In this way, as one transducer 110 is sending a pulse outwardly, its neighboring transducer 110 on either side are set to receive a pressure wave therefrom. Conversely, at the next cycle, the situation will now have been reversed and the transducers 110 which have been projecting a pulse will now be in a position to receive a pulse. Please see FIG. 11.

Figure 12:
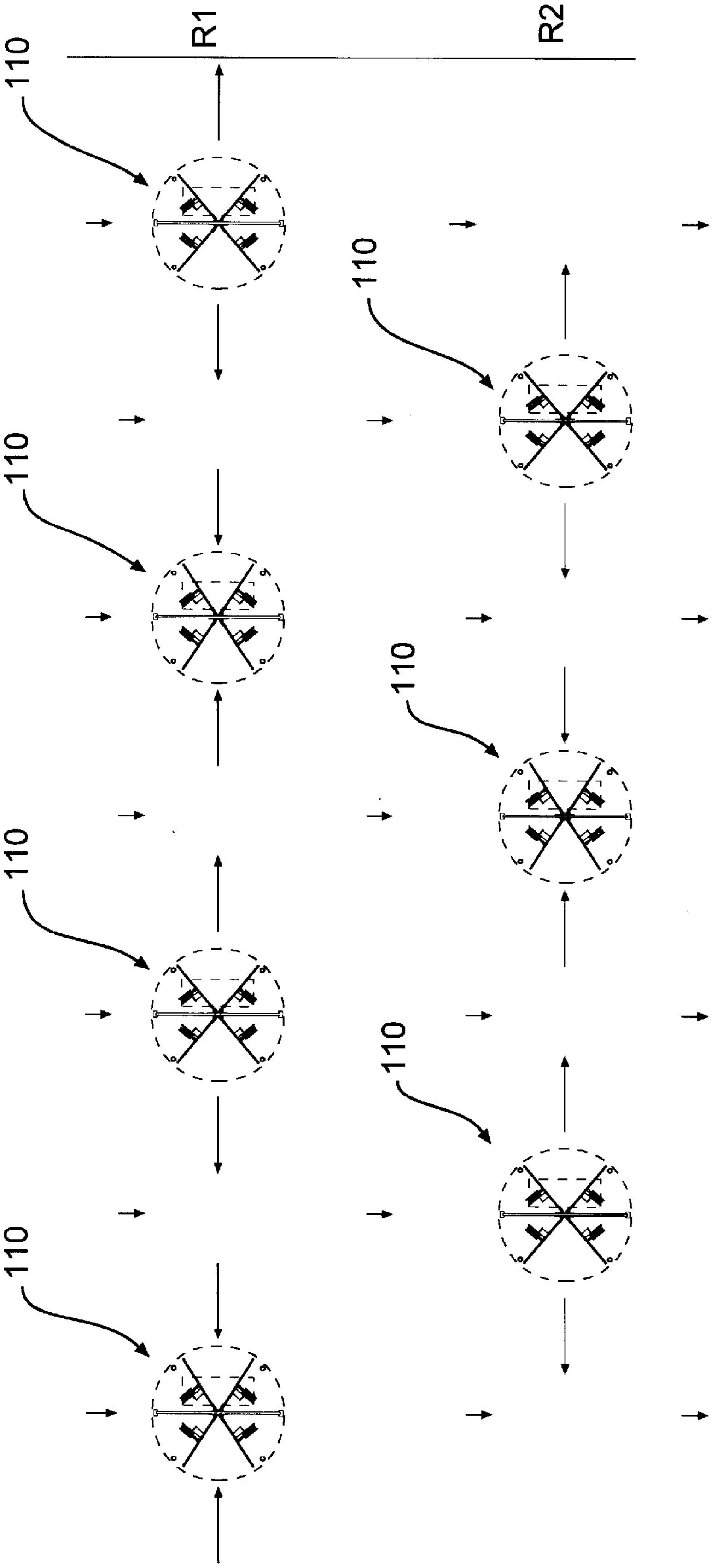
FIG. 12 shows another possible orientation of the transducers of FIGS. 9 and 10.

FIG. 12 shows another strategy in orchestrating a plurality of transducers 110 as a matrix. One illustrative matrix is shown as having at least two rows. As FIG. 12*a* suggests, the analysis for the first row $R_1$ parallels the discussion for FIG. 11*a*. Similarly, the analysis for row $R_2$ parallels the discussion for FIG. 11*b*. Note, however, that the transducers 110 of the first and second rows have offset the transducers 110 of row two with respect to row one. Stated alternatively, each central space between transducers 110 in row one finds a corresponding transducer 110 located in row two.

It should be evident, in view of the forgoing, that various other orientations of transducers 110 can be utilized based on the specific assessment of the needs at a given site. Stated alternatively, one possible scenario would include the steps of determining a signature of the source of noise pollution and/or the way that it normally radiates from the source, such as a highway. Next orienting the array 100 of transducers 110 strategically adjacent the source of noise pollution generates the corrective pressure wave which meets the source of noise pollution by projecting an active pressure wave from the array 100 of transducers 110 to alter the profile of the noise.

Moreover, having thus described the invention, it should be apparent that numerous structural modifications and adaptations may be resorted to without departing from the scope and fair meaning of the instant invention as set forth hereinabove and as defined hereinbelow by the claims.

I claim:

1. A device for abating traffic noise, comprising, in combination:

a plurality of transducers oriented in an array strategically placed proximate a source of noise pollution and physically detached therefrom, means in each said transducer to alter a pressure wave emanating from said source and for selective projection of certain waves from each transducer to correlate with portions of the noise being treated, and means coupled to each transducer for orchestrating a sequence in which plural said transducers are enabled.

2. The device of claim 1 wherein said plurality of said transducer are oriented in a single row adjacent a highway thereby defining said array with every other transducer in said single row in phase and the remaining transducers 180° out of phase to oppose vehicular noise on the highway.

3. A method for abating traffic noise pollution, the steps including;

determining a signature of the traffic noise pollution, determining a radiating pattern of the traffic noise pollution, orienting an array of transducers strategically adjacent a highway carrying said traffic for meeting a pressure wave which emanates from the traffic, and projecting an active pressure wave from the array of transducers to meet with the pressure wave of the traffic noise pollution to alter the profile of the traffic noise pollution produced by vehicles on said highway.

4. The method of claim 3 further including sequencing certain transducers in the array to operate in synchrony and other transducers to operate 180° out of phase.

5. A transducer for use in attenuating a noise pressure wave emanating from a source comprising in combination:

means for supporting said transducer adjacent a highway, means formed with the transducer and including at least one diaphragm for inducing a corrective pressure wave, means for orienting the corrective pressure wave from the transducer towards the source of noise, and means for altering a characteristic of the corrective pressure wave emanating form the transducer specific to a signature of the noise pressure wave emanating from the source of noise.

6. The transducer of claim 5 wherein said diaphragm has drive means operatively coupled thereto.

7. The transducer of claim 6 wherein said drive means includes at least one current carrying coil operatively coupled to a drive rod which in turn is operatively coupled to said diaphragm.

8. The transducer of claim 7 wherein said drive means further includes means for providing a constant magnetic field in which said coil is located.

9. A transducer for use in attenuating a noise pressure wave emanating from a source comprising in combination:

means formed with the transducer for inducing a corrective pressure wave, means for orienting the corrective pressure wave from the transducer towards the source of noise, and means for altering a characteristic of the corrective pressure wave emanating from the transducer specific to a signature of the noise pressure wave emanating from the source of noise, said means for inducing a corrective pressure wave includes at least one diaphragm, said diaphragm has drive means operatively coupled thereto, said drive means includes at least one current carrying coil operatively coupled to a drive rod which in turn is operatively coupled to said diaphragm, said drive means further includes means for providing a constant magnetic field in which said coil is located, and means for supporting said transducer adjacent a highway.

10. The transducer of claim 9 wherein a pair of said diaphragms is located within said transducer, said diaphragms oriented to form in section a substantially V shaped configuration and said diaphragms adapted to move about an arc of a circle between opening and closing, each said diaphragm operatively coupled to an independent said drive means and to operate in synchrony with each other whereby each said diaphragm moves towards or away from each other in concert.

11. The transducer of claim 10 wherein said transducer has a housing configured as a cylinder having a long axis oriented substantially vertically and said cylinder has a closed top wall, a closed bottom wall and a perforated peripheral skin circumscribing said transducers and a crossmember bisects said cylindrical transducer about a vertical axis of symmetry.

12. The transducer of claim 11 wherein said pair of diaphragms are operatively coupled to said crossmember substantially at said long axis of said transducer by a pair of hinge members allowing said diaphragms to move in an arc about said long axis.

13. The transducer of claim 12 wherein said transducer resides upon a footing having a peripheral ridge, a flange extending down from a lower most portion of said transducer peripheral skin and circumscribing said peripheral ridge and a bracket connected between said flange and said peripheral ridge including a horizontal portion adapted to reside on said peripheral ridge to fix and locate said transducer on said footing.

14. The transducer of claim 13 including an amplifier operatively coupled to said transducer to drive said diaphragms.

15. The transducer of claim 14 wherein each said drive means includes a coil, a coil guide disposed within said coil, said coil guide held in fixed relation by connection to said crossmember, means to reciprocate said coil between a first and second position, an arm connected to said coil and a drive rod connecting said arm to said diaphragm whereby said drive rod moves between a first and second position, and said coil guide supported between a pair of first and second side plates separated therefrom by spacer means, one said side plate connected to said crossmember.

16. The transducer of claim 15 wherein said drive means is connected in said transducer to a driver brace which extends between a floor of said transducer and a cap, and a spring is connected on said brace to said diaphragm to limit the range of motion of said diaphragm and urge said diaphragm to another position upon a change in the magnetic field.

17. A method for abating noise pollution, the steps including;

determining a signature of the source of noise pollution, determining a radiating pattern of the source of noise pollution, orienting an array of transducers strategically adjacent the source of noise pollution for meeting a pressure wave which emanates from the source of noise pollution, projecting an active pressure wave from the array of transducers to meet with the pressure wave of the source of noise pollution to alter the profile of the noise pollution, and orienting the transducers adjacent a highway and directing the active pressure waves to oppose vehicular highway noise.

18. A transducer for use in attenuating a noise pressure wave emanating from a source comprising in combination:

means formed with the transducer for inducing a corrective pressure wave, means for orienting the corrective pressure wave from the transducer towards the source of noise, means for altering a characteristic of the corrective pressure wave emanating from the transducer specific to a signature of the noise pressure wave emanating from the source of noise, and means for supporting said transducer adjacent a highway.

19. A device for abating noise, comprising, in combination:

a plurality of transducers oriented in an array strategically placed adjacent a source of noise pollution, means in each said transducer to alter a pressure wave emanating from a source of the noise pollution, and means coupled to each transducer for orchestrating a sequence in which plural said transducers are enabled, means in each said transducer for selective projection of certain waves from each said transducer to correlate with portions of the noise to be treated, said plurality of said transducers are oriented in a single row adjacent a highway thereby defining said array with every other transducer in said single row in phase and the remaining transducers 180° out of phase to oppose vehicular noise on the highway.

20. The device of claim 19 wherein said plurality of transducers includes a second row with transducers located in said second row at midpoints between transducers in said single row.

21. A device for abating noise produced by a moving object travelling in a path and causing pressure waves which carry audible sound, comprising in combination:

a plurality of pressure wave producing transducers oriented in a static array strategically placed proximate said path and physically detached from said moving object, to produce a sequence of pressure waves which alter said pressure waves caused by said moving object to thereby abate said noise.

22. The device of claim 21 wherein said static array of transducers are oriented proximate a highway.

23. A method for abating noise produced by a moving object travelling in a path and generating a pressure wave carrying audible noise, comprising the steps of:

a. producing a series of pressure waves from a location proximate said path and physically detached from said object; and, b. sequencing said series of said waves in cooperating phase relationships, so as to alter the pressure waves generated by said moving object, thereby abating said noise.

24. The method of claim 23 wherein said path is a highway.

* * * * *